United States Patent
Sans Rovira et al.

(10) Patent No.: US 6,783,675 B1
(45) Date of Patent: Aug. 31, 2004

(54) SOFT-MOUNT WASHER EXTRACTOR WITH UNBALANCE COMPENSATOR SYSTEM

(76) Inventors: Ramon Sans Rovira, Cami Verinal, 31, E-08551, Tona (ES); Ignasi Riera Curcoll, Pont, 6, 2°3°, E-08570, Torello (ES); Carles Riba Romeva, Calle Rosers, 5 1°2°, E-08970, Sant Joan Despi (ES)

( * ) Notice: Subject to any disclaimer, the term of this patent is extended or adjusted under 35 U.S.C. 154(b) by 0 days.

(21) Appl. No.: 10/169,684

(22) PCT Filed: Jan. 5, 2000

(86) PCT No.: PCT/ES00/00003

§ 371 (c)(1),
(2), (4) Date: Nov. 5, 2002

(87) PCT Pub. No.: WO01/49918

PCT Pub. Date: Jul. 12, 2001

(51) Int. Cl.⁷ .............................. B04B 9/14; D06F 37/22; F16F 15/36
(52) U.S. Cl. .................. 210/360.1; 210/363; 210/380.2
(58) Field of Search .............................. 210/360.1, 363, 210/380.1, 380.2; 68/12.01, 12.04, 12.06

(56) References Cited

U.S. PATENT DOCUMENTS

| | | | |
|---|---|---|---|
| 2,525,781 A | 10/1950 | De Remer | 210/363 |
| 3,683,647 A * | 8/1972 | Coshow | 68/23.2 |
| 3,800,622 A | 4/1974 | Stelwagen et al. | 74/573 R |
| 4,402,199 A * | 9/1983 | Waugh | 68/23.3 |
| 5,497,638 A * | 3/1996 | Berkcan et al. | 68/12.04 |
| 5,813,253 A | 9/1998 | Uhlin | 68/23.2 |
| 6,422,047 B1 * | 7/2002 | Magilton | 68/12.06 |
| 6,510,715 B1 * | 1/2003 | Simsek | 68/12.06 |
| 6,578,225 B2 * | 6/2003 | Jonsson | 8/159 |

FOREIGN PATENT DOCUMENTS

| | | |
|---|---|---|
| ES | 2 092 238 | 7/1994 |
| GB | 1077489 | 7/1967 |

* cited by examiner

*Primary Examiner*—Fred G. Prince
(74) *Attorney, Agent, or Firm*—Michael J. Folise, Esq.

(57) ABSTRACT

Said floating group comprises: a drum (20) aligned with a center line (M) which rotates within a wrapping bin (10) driven by a motor (32), and when it rotates it creates, by an effect of masses unbalance, an actual rotation axis (N) different from said center line (M); a counterweigh (40) of mass $m_{CE}$ associated to a front part of the bin (10) and a counterweigh (42) of mass $m_{CT}$ associated to a front part of the drum (20), where the ratio $[m_{CT}/(m_{CE}+m_{CT})] \times 100 \geq 55$, said mass $m_{CT}$ either a given magnitude centered with said center line (M) or a very lower magnitude and in the form of one or more fluid rings (60), the stresses the floating group sustains resulting substantially reduced, it being for it made in a light construction.

15 Claims, 4 Drawing Sheets

SOFT-MOUNT WASHER EXTRACTOR WITH UNBALANCE COMPENSATOR SYSTEM

FIELD OF THE INVENTION

This invention in general relates to a centrifugal machine with a suspended floating group and an overhanging drum, specially applicable to washing-centrifugal machines designed to high centrifugal speeds with high G factors, in which said floating group essentially comprises a wrapping bin to contain and/or to collect a bath, a drum having bored walls for a load of material to be centrifuged mounted so that it can rotate within said wrapping bin, and a motor fixed on the wrapping bin and connected to said drum to rotate it, in said machine a suitable ratio of counterweigh masses provides as result a reduction of structural stresses at the floating group which allow a light construction thereof and namely of the wrapping bin.

BACKGROUND OF THE ART

The method of withdrawing water from a wetted material through centrifugation is well-known and it is thoroughly used, for example, in the either industrial or home sector of clothes washing, because of its high performance of withdrawal with relation to the power expense compared with other methods. In this sector, it is very usual to use machines capable to wash and subsequently to centrifuge a load of clothes introduced in a drum having bored walls mounted so that it can rotate within a wrapping bin capable to contain succeeding bathes of washing and rinsing and to collect the rests of said bathes extracted from the clothes during an end centrifuging step. For this, one or more motors are connected to the drum to successively rotate it at different speeds according to the washing, rinsing and centrifuging steps, driven by programmable control means.

It is very typical that the drum is situated so that during the operation, its hinge axis is horizontal or slightly inclined with respect to the horizontal, and that it has a loading/unloading mouth at an axial end thereof, coinciding with an opening of the wrapping bin. This is specially advantageous in industrial machines designed to heavy loads of clothes in which the radial loading mouth would result of a very complex access because of its great height. The existence, however, of said loading/unloading mouth at one end of the drum obliges to support it overhanging from the axial end opposite to the loading/unloading mouth, by means of a driving shaft integral with the drum rear wall, supported and guided by bearings housed within a bearing box fixed on the wrapping bin. This arrangement, although it results very favourable from an ergonomic standpoint, produces stronger bending moments on the driving shaft and transmits stresses on the bearings stronger than if the drum had been supported and guided at both ends. In addition, when the drum rotates at such a speed that it produces a centripetal acceleration on the clothes load higher than 1 G (G=earth gravity acceleration=about 9.8 $ms^{-2}$), such as during a centrifugation, where 200, 300 and even over 400 G factors are reached, the clothes are radially applied against the drum wall at a random relative given position, which virtually does not vary while the effect of said speed is kept. Said random relative position has a very high probability to produce a centre of the masses of the clothes load misaligned with respect to the drum centre line, which is aligned with the driving shaft and therefore the centre of the masses of the drum and clothes load group will also be shifted with respect to said centre line. In these conditions, said drum and clothes load group will tend to rotate with respect to said misaligned centre of masses of the drum centre line, or with other words, the drum centre line will tend to rotate about an actual rotation axis different from the centre line, producing a wellknown vibrating motion which is transmitted to the whole floating group. Said vibrating motion is generally decreased adding counterweights and it is absorbed by said floating group system of suspension, formed by springs and vibration eliminators linked to a machine frame or bench.

U.S. Pat. No. 2,525,781, of Jey Grant De Remer, applied for on Sep. 15, 1944, discloses an equilibrating system for rotating bodies, specially applicable to clothes washing-centrifugal machines, based on providing one or more annular chambers partly filled with a fluid, located on different areas of the drum and coaxial with respect to the centre line thereof. Each of said chambers is formed by substantially parallel external and internal concentric annular walls and substantially parallel sidewalls, and there exists within them deflecting means which tend to drift the fluid contained within the chambers without preventing a free distribution thereof. When the rotation speed of the equilibrating ring and the drum is such it produces a G factor over 1 and over the floating group resonance frequency, the fluid of the interior of the equilibrating chamber is applied against said external wall thereof, which is coaxial with respect to the drum centre line, at same time it defines an internal circular horizon coaxial with respect to the actual rotation axis, a centre of masses of said fluid being created which is shift with respect to the actual rotation axis in a direction just opposite to the shift of the masses centre of the clothes load and therefore equilibrating it. Jey Grant De Remer discloses in said patent U.S. Pat. No. 2,525,781 that the optimum equilibrated situation is produced when the radial height at the point of the fluid maximum radial height within the equilibrating chamber is twice the distance between the centre line and the actual rotation axis, that means, twice the amplitude of the machine vibrating motion, and when the circle of the chamber external wall and the circle of the fluid circular horizon are tangent at a point diametrally opposite to the maximum height. Jey Grant De Remer also demonstrates that it is more favourable to arrange two concentric equilibrating chambers instead of a single chamber having a height equivalent to the sum of the other two, with same width and an amount of contained fluid equivalent to the other two together.

In said patent U.S. Pat. No. 2,525,781, however, of Jey Grant De Remer, only the drum equilibrating is discussed without discussing, at any moment, the dynamic effect of the "pitching motion" that the masses of clothes load and of the fluid rings produce on the floating group, therefore the position of the equilibrating fluid rings on the drum appears as a minor matter, obeying more to formal or construction criteria than to dynamic requirements.

Said dynamic effects of "pitching motion" consist in a drum dynamic shift, and therefore of the floating group, which has a different amplitude at each of its ends, being generally, in this kind of machines, of a larger amplitude at the drum end farther away from the bearings.

In the state of the art shiftable solid mass rings are known, for example for an embodiment of SKF company, which includes solid balls, generally of steel, enclosed in an annular circuit, which, when the group is subject to an misaligned rotation which produce G factors over 1, are concentrated being situated at the area of said annular circuit farthest from actual rotation axis. In the most recent embodiments, as the one disclosed in patent U.S. Pat. No. 5,813,253, in order to prevent noises produced by the balls colliding with each other when rotating at low speed, it is provided a locking device formed by cages which match the balls two by two, in said cages there is a spring-loaded pin, which at G factors under 1, pushes the pin in order it is inserted in holes arranged on the internal track of the annular circuit. When G factors are substantially over 1, the pin mass itself generates a centrifugal force which gets over said spring releasing the cage with its related pair of balls, which then shift until they concentrate at said area farthest from the actual rotation axis.

Although said ball device showed to be very effective as for its balance compensating effect, the requirements of accurateness of its complex construction make its cost very high, over all if it is borne in mind that, in an application as the one proposed, said device will sustain continuous dipping on the baths of the washing and rinsing processes, making its implementation absolutely unworkable.

Patent DE-A-1610177, of Siemens-Electrogerate GmbH, applied for on Oct. 6, 1967, discloses a clothes washing-centrifugal machine in which a single equilibrating fluid ring is arranged at the end of the drum closest to the bearings. The ring comprises a relatively large capacity chamber and means to partly fill with fluid or to empty said chamber depending on the washing and centrifuging steps. The drum has a slightly conical shape, its diameter decreasing when moving away from the bearings, which favours an advantageous accumulation of the clothes load towards the wider area, that means, towards the area closest to the bearings. The arrangement of the fluid ring, however, in this wider area does not favour masses dynamic balance.

Currently, the generalized practice of the manufacturers of washing-centrifugal machines consists in placing solid counterweights fixed on the wrapping bin and, to a lesser extent, on the drum. Because the heaviest elements of the floating group, that means, motor, bearing box, bearings, drum reinforced rear wall and wrapping bin, are concentrated at the rear end, or farthest from the floating group loading mouth, the solid counterweighs are mainly located at the front ends or closest to the loading mouth, of the drum and the bin. To fix counterweights on the drum, however, has the drawback that these will sustain the washing baths, which means associated problems of corrosion which oblige to use anti-rust construction materials and elements which results in a high cost. In addition, to place large additional masses on the rotating drum shows a drawback from the standpoint of an increase of the moment of inertia which impairs the drum accelerations. Therefore, it is a generalized practice to place large counterweigh masses at the front part farthest from the bearings, of the wrapping bin.

For the purpose of this description, often the terms "front and rear" will be used referring to parts of the wrapping bin or the drum as those parts respectively farthest or closest to the bearings.

On the market, a clothes washing centrifugal machine is known of the company Maytag Corporation which matches a large counterweigh fixed at the front part or the farthest from the bearings, of the wrapping bin with two fluid equilibrating rings, such as the disclosed in patent U.S. Pat. No. 2,525,781, concentric on the drum front face, at an external peripheral area of the loading/unloading mouth. The advantage of the fluid rings is that, as it was explained above, with an actual fluid mass relatively small they provide an effect as for centrifugal force equivalent to a very higher mass, so that the wished effect of balance is achieved without excessively increasing the moment of inertia of the drum.

However, the large counterweigh mass fixed at the part of the bin farthest from the bearings provokes, as it will be explained below, great stresses on the floating group structural elements, namely on the driving shaft, bearing box, bearings, drum and wrapping bin reinforced rear walls, and in general all the remaining walls of the drum and the bin, which oblige to construct them with high mechanical strength requirements which results in an heavy construction. Said heavy construction, concentrated at the rear part of the floating group, increases in turn the amplitude of the vibrating effect at the front part, which makes advisable to increase even more the counterweighs on said front part and so on.

SUMMARY OF THE INVENTION

An aim of this invention is to provide with a centrifugal machine having a suspended floating group and an overhanging drum, applicable to washing-centrifugal machines designed to high-speed centrifugation with high G factors, in which a suitable distribution of the counterweigh masses results in reducing the structural strengths which allows the construction of the main elements of said floating group, such as the wrapping bin, drum said bearing box, bearings, and said driving shaft, with mechanical strength requirements, either for the shape, materials or components, significantly lower with respect to those necessary without said suitable distribution of the masses, for same performances of high-speed centrifugation, and therefore with lower costs.

This aim is achieved, according to this invention, by transferring a significant part of the counterweigh associated to the front part of the wrapping bin to the front part of the drum, so that the mass, either actual or equivalent obtained by fluid rings, of said counterweigh associated to the drum is at least 55% the sum of the masses of the counterweigh itself associated to the drum and the counterweigh associated to the wrapping bin.

It has to be pointed out that for the purpose of simplifying the language, in this description often the expression "actual mass" and "equivalent mass" counterweigh for the drum refers, respectively, to a generally solid counterweigh, with a mass of a given magnitude and centred on the centre line of the drum and to a counterweigh having a very lower magnitude and in the form of one or more fluid rings which, when rotating at such a speed it produces a G factor over 1 and over the floating group resonance frequency, it is misaligned at a distance very higher than the amplitude of the dynamic shift of the floating group producing dynamic effects equivalent to those of said mass of a given magnitude.

In fact, the present inventors found, through the theoretical analysis corroborated by actual practical tests and by means of simulation computer programs, that the effects as for a dynamic balance produced by a counterweigh fixed on the front part of the wrapping bin are equivalent to those produced by a counterweigh having same mass fixed at the front part of the drum (supposing that both are located at same distance from the bearings), while transferring said counterweigh from the front part of the bin to the front part of the drum, every part of the wrapping bin, such as the bearing box, the bearings, the shaft and the rear part of the drum are released from the structural stresses attributable to the transmission of stresses carried out by said counterweigh. If, in addition, by virtue of the dynamic properties offered by the drum rotation, fluid equilibrating rings are used which have an actual mass very lower than the mass equivalent to the transferred counterweigh, the structural stresses sustained by the drum also decrease. These decreases of structural stresses make possible a lighter construction of the floating group elements, which alleviate the masses concentration at the rear end thereof, which means that the mass, either actual or equivalent, of the counterweigh associated to the front part may also be smaller, which in turn reduces the structural stresses and so on. Therefore, said transfer of masses results very advantageous and is translated in an important decrease of the costs, because, for example, the wrapping bin can pass from a stainless plate welded construction, usual in machine having an over 7 Kg capacity and centrifugation values of 250 G or over, to a construction by plastic injection moulding, integrating the bearing box which otherwise can probably be a part of steel casting and the driving shaft and related bearings would be much smaller and therefore also cheaper. By providing a generally lighter weigh to the machine of this kind also involves an easier transport and lower requirements as for the structural strength of the place where they are installed.

The suspension system is capable to absorb a given amplitude of vibration of the floating group, therefore a relatively strong vibrating movement does not mean a drawback from the mechanical standpoint while it is within the interval capable to be absorbed by the suspension. Now then, for the reasons above explained, said amplitude of the vibrating movement is generally higher at the front part of the floating group than at the rear part, which entails higher flexibility requirements at elastic connections usually arranged between the door of the frame and the loading/unloading mouth at the front part of the floating group, in addition to an unpleasant visual feeling for the user. It is therefore advisable to decrease said vibration amplitude arranging a given counterweigh mass on the front end of the wrapping bin in addition to the counterweigh mass arranged on the front part of the drum. The present inventors determined that from a relation of the counterweigh mass associated to the front part of the drum with respect to the sum of the counterweigh masses respectively associated to the front part of the drum and to the front part of the bin of 55% the advantageous effects of said masses transfer object of the construction principle of this invention are sufficiently important to allow said light construction of the floating group.

SHORT DESCRIPTION OF THE DRAWINGS

This invention will be best understood from following explanations and detailed description of examples of embodiment thereof relative to a clothes washing-centrifugal machine, which are provided with reference to drawings attached, in which.

DETAILED DESCRIPTION OF THE INVENTION

Figures 1A, 1B:
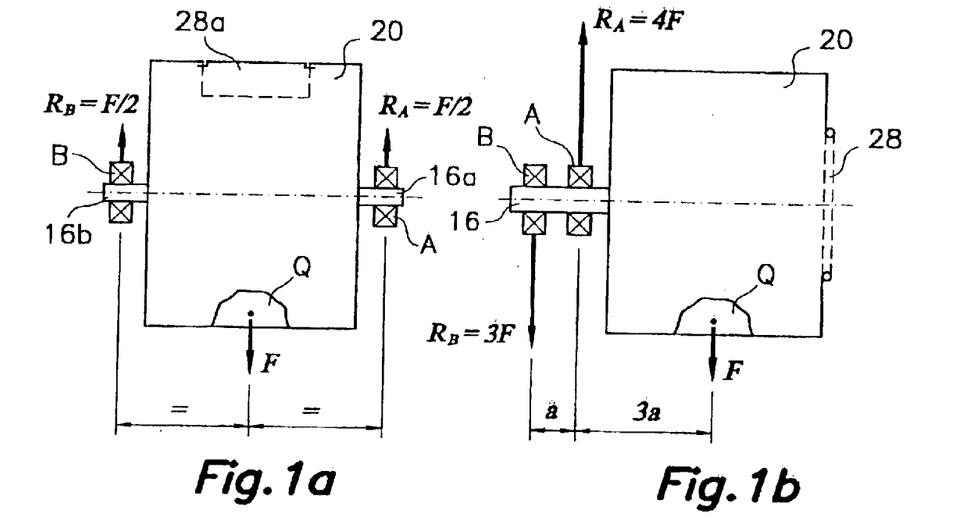
FIGS. 1a and 1b are comparative schematic illustrations of a drum of a centrifugal machine supported and guided at its two ends and a drum of a centrifugal machine supported and guided overhanging, respectively.

Referring first to FIGS. 1a and 1b, they show how the fact of having available a loading/unloading mouth 28 of axial access (FIG. 1b) in the drum 20 is ergonomically advantageous but strongly increases the stresses that its structural elements sustain under the influence of a force F exerted by the mass of a wetted clothes load Q, subject to the centripetal acceleration due to the rotation of said drum. Thus, in FIG. 1a, a drum 20 is illustrated with a loading/unloading mouth 28a of radial access. From the walls of both ends of the drum are protruding shafts 16a, 16b supported and guided by bearings A, B. Supposing that the force F is applied on a point in the middle of the drum, equidistant from the bearings A, B, these generate respective reactions $R_A=R_B=F/2$. On the contrary, the drum of FIG. 1b, having same dimensions as the drum of FIG. 1a, has a loading/unloading mouth 28a, of axial access, located on a wall of an end and therefore is supported and guided through a shaft 16 which protrudes from the opposite end wall, inserted in bearings A and B. Supposing that the force F is also applied on a point in the middle of the drum, which in this case is, for example, at a 3a distance from the bearing A, which is, for example at a distance from bearing B, the reaction of the bearing A is $R_A=4F$ and the reaction of the B bearing is $R_B=3F$, that means, 8 and 6 times higher, respectively, than the corresponding reactions of the bearings of the drum of FIG. 1a for a same force F applied to a same medium point. This invention relates to machines which comprise a drum supported overhanging of the type of the one of FIG. 1b.

The drum is supported overhanging within a wrapping bin, a motor being fixed to the bin and connected to the drum so that it can rotate within it. The group of wrapping bin, drum and motor constitutes the so-called "floating group", which is suspended from a frame or bench by suspension means which comprise elastic elements and vibration eliminators in order to absorb the vibrating motions generated by the misaligned mass of the clothes load during the centrifugation.

Figure 2A:
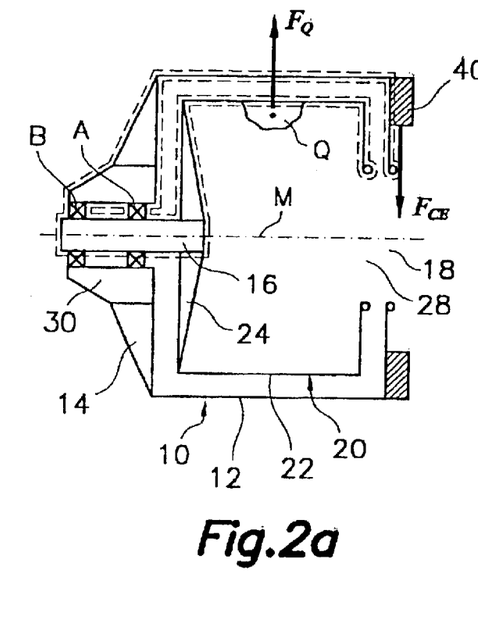
FIGS. 2a and 2b are comparative schematic illustrations which illustrate those parts sustaining structural stresss in a floating group of the state of the art of clothes and a floating group according to this invention, respectively.
Figure 2B:
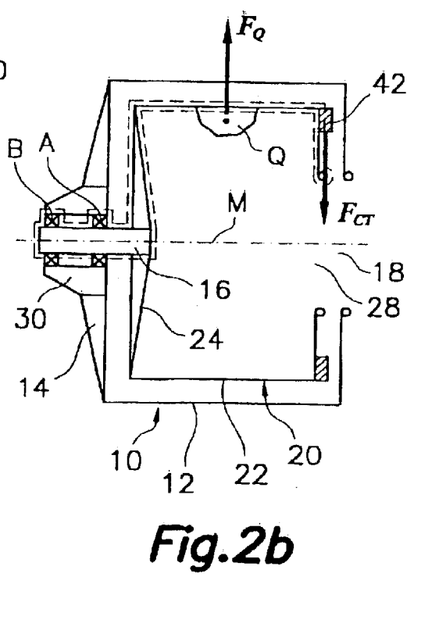

In FIGS. 2a and 2b, the floating groups of a machine of the state of the art and a machine according to this invention, respectively, are illustrated, formed by a wrapping bin 10 which comprises an external wall 12 of revolution about a centre line M and a rear wall 14 on which is fixed a bearing box 30 in which are housed bearings A, B. Within said wrapping bin, a drum 20 is arranged which has also an external wall 22 of revolution about a centre line M and a rear wall 24 on which a driving shaft 16 is fixed inserted in said bearings A, B. The wrapping bin 10 and the drum 20 have, on their faces opposite to the rear walls, respective loading/unloading mouths 18, 28, of axial access, coinciding. On one end of the shaft 16, protruding from the bearing box 30, a pulley is mounted to which a motor is connected (not illustrated in FIGS. 2a and 2b) by means of a belt drive to rotate the drum Within the bin.

In the floating group of the state of the art (FIG. 2a), a counterweigh 40 is fixed on the front part of the wrapping bin 10, while in the floating group according to this invention (FIG. 2b), a counterweigh 42 is fixed on the front part of the drum. In both cases, at an area on the middle of the drum a force $F_Q$ is applied, represented by an arrow, exerted by a clothes load Q. The counterweigh 40 associated to the bin 20 exerts a force represented by an arrow $F_{CE}$ in the FIG. 2a while the counterweight 42 associated to the drum 20 exerts a force represented by an arrow $F_{CR}$ in the FIG. 2b. In these FIGS. 2a and 2b in addition to wrapping lines all the parts and components which sustain a significant structural stress during a centrifugation mainly attributable to the forces $F_Q$ and $F_{CE}$ in the case of the FIG. 2a or to the forces $F_Q$ and $F_{CT}$ in the case of FIG. 2b have being shown.

It is obvious that said schematic representations are very simplified, as many factors have been omitted, such as the masses of the bin and the drum themselves, which also play an important part, but they have been considered sufficiently illustrative to offer a direct display of the principle on which this invention is based.

In fact, in the drum of FIG. 2a, the equilibrating forces are transmitted through a large path coming from the load $F_Q$ applied to the drum (clothes load Q) to the equilibrating force $F_{CE}$ associated to the bin (counterweight 40). As it can be seen, the parts and the components which sustain a significant stress (signalled by said wrapping line) are the external wall 22 and the rear wall 24 of the drum 20, the driving shaft 16, the bearing box 30, the bearings A and B and the rear wall 14 and the external wall 12 of the wrapping bin 10.

On the contrary, in the drum of FIG. 2b, the equilibrating forces are transmitted through a very shorter path which comes from the equilibrating force $F_{CT}$ associated to the drum (counterweight 42) to the reactions of the bearings, passing by the load $F_Q$ applied to the drum (clothes load Q). In this case, the parts and components which sustain the stress (signalled by said wrapping line) are the external wall 22 and the rear wall 24 of the drum 20, the driving shaft 16, the bearing box 30 and the bearings A and B, although the stresses on the driving shaft 16, the bearing box 30 and the bearings A and B are lower because the forces $F_Q$ and $F_{CT}$ have opposite directions and produce opposite bending moments which counteract on the shaft 16. The rear and external walls 14, 12 of the wrapping bin 10 are released from stresses attributable to forces exerted by the counterweigh masses.

In the machine of this invention, the counterweigh 42 associated to the front part of the drum, is matched with a counterweigh 40, of a mass significantly lower, associated to a wrapping bin, in order to contain the amplitude of the dynamic motion within ergonomically suitable limits. On their side, in the machines of the state of the art, a relatively small counterweigh 42 has been eventually arranged, fixed on the front face of the drum 20 in addition to the large counterweigh 40 associated to the front face of the wrapping bin, but without affecting the structural characteristics of the wrapping bin 10 and the rest of components of the floating group. In both cases, the counterweigh 42 fixed on the front part of the drum can be of an actual mass, although it is preferable it is of an equivalent mass obtained by dynamic effect on shiftable masses, such as the fluid rings explained above, or such as rings through which solid bodies are freely moving, for example, metallic balls. The essential contribution of this invention is that the main counterweigh is the counterweigh 42 associated to the front part of the drum 20 in the floating group, its mass, actual or equivalent, being at least 55% the total mass of the counterweighs associated to the front part of the floating group, that means, the sum of the masses of the counterweighs 40 and 42 respectively associated to the front parts of the wrapping bin 10 and the drum.

Figure 3A:
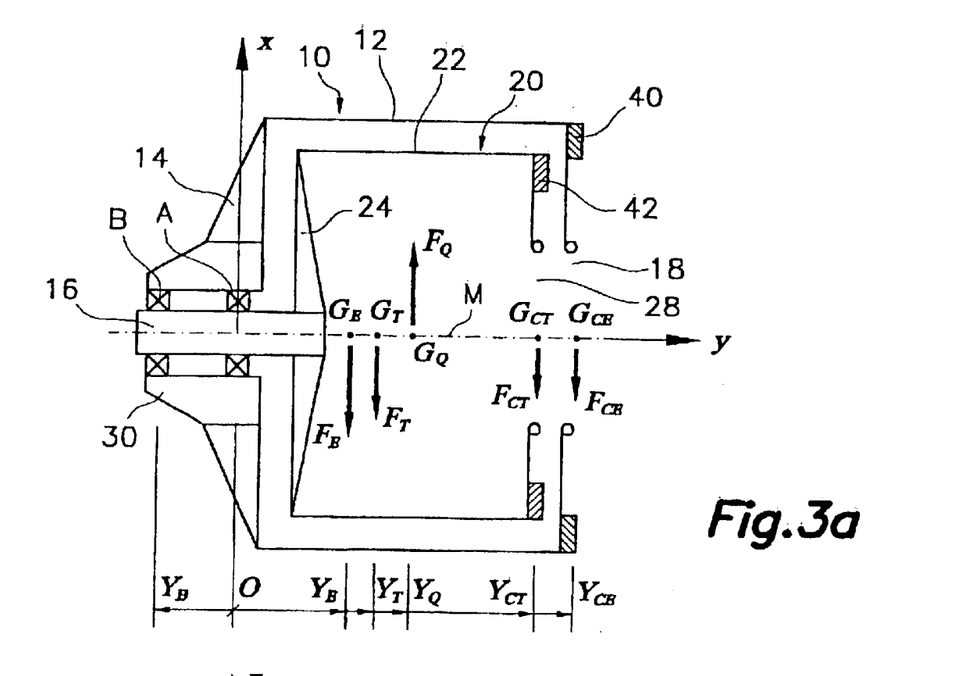
FIGS. 3a, 3b and 3c are forces diagrams which will serve to explain the effects of the forces which act on the floating group, on the drum 20 and on the wrapping bin 10, respectively.
Figure 3B:
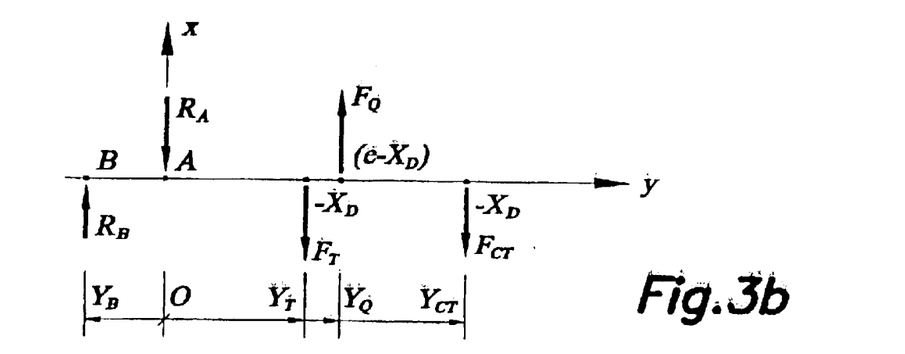
Figure 3C:
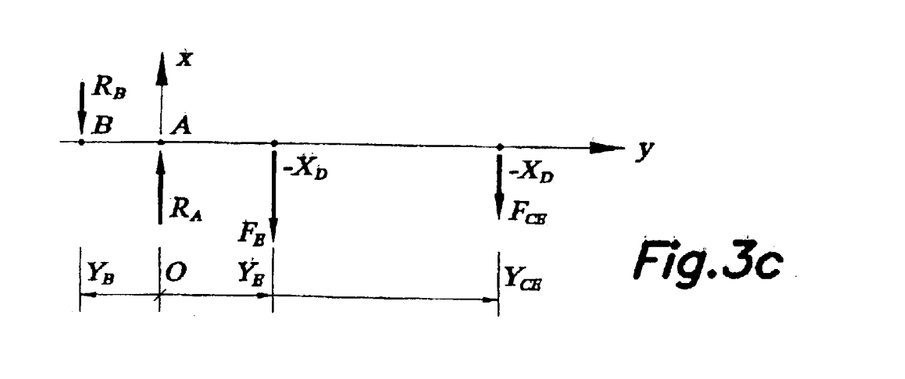

FIGS. 3a, 3b and 3c are forces diagrams which will serve to explain the dynamic effects of the forces which act on the floating group, on the drum 20 and on the wrapping bin 10, respectively.

As it was explained above, when the drum rotation speed is slightly over a G factor equal to 1, the fluid begins to be applied against the external annular wall of the chamber, although in these conditions the force of the earth gravity produces important distortions in the formation of said internal circular horizon. At high rotation speeds, however, such as those used during a centrifugation, the effect of earth gravity with respect to the centripetal acceleration is insignificant, therefore it has not been taken into account in the calculations. Neither other factors were taken into account such as the possible warp of the drum centre line with relation to the actual rotation axis, therefore following equations are a simplified model but sufficiently illustrative of the conditions of the machine as well static as dynamic total balance.

FIG. 3a schematically shows the floating group formed by the wrapping bin 10 which comprises the external wall 12 and the rear wall 14 on which the bearing box 30 is to be fixed and in which bearings A and B are housed. Within said wrapping bin, the drum 20 is arranged which has related external wall 22 and the rear wall 24 on which the driving shaft 16 is fixed, inserted in said bearings A, B. The wrapping bin 10 and the drum 20 have, on their faces opposite to the rear walls, the respective loading/unloading mouths 18, 28, of axial access, coinciding. Once again the motor has been omitted.

For the following explanations, we will use a system of Cartesian coordinates formed by:

| | |
|---|---|
| O: | Origin of the coordinates; situated at the centre of bearing A when at rest. |
| y axis: | Direction according to the drum rotation axis; positive direction from the Origin towards the loading/unloading mouth 28. |
| x axis: | Direction parallel to the direction of the clothes load unbalance; positive direction from the Origin outwards parallel to the clothes load unbalance. |
| z axis: | The corresponding according to the right hand rule. |

In the exposition following parameters will be used, some designations of which also appear in FIGS. 3a, 3b and

| | |
|---|---|
| $m_Q$: | Mass of the wetted clothes load |
| $m_T$: | Mass of the drum without counterweighs |
| $m_E$: | Mass of the wrapping bin without counterweighs |
| $m_{CT}$: | Mass of the counterweigh associated to the drum |
| $m_{CE}$: | Mass of the counterweigh associated to the wrapping bin |
| $F_Q$: | Centrifugal force due to the mass of the wetted clothes load |
| $F_T$: | Centrifugal force due to the mass of the drum without counterweighs |

-continued

| | |
|---|---|
| $F_E$: | Centrifugal force due to the mass of the wrapping bin without counterweighs |
| $F_{CT}$: | Centrifugal force due to the mass of the counterweigh associated to the drum |
| $F_{CE}$: | Centrifugal force due to the mass of the counterweigh associated to the wrapping bin. |
| $G_Q$: | Centre of the masses of the wetted clothes load |
| $G_T$: | Centre of masses of the drum without counterweighs |
| $G_E$: | Centre of masses of the wrapping bin without counterweighs |
| $G_{CT}$: | Centre of masses of the counterweigh associated to the drum |
| $G_{CE}$: | Centre of masses of the counterweigh associated to the wrapping bin. |
| $Y_Q$: | Distance from the origin to $G_Q$ on the axis y |
| $Y_T$: | Distance from the origin to $G_T$ on the axis y |
| $Y_E$: | Distance from the origin to $G_E$ on the axis y |
| $Y_{CT}$: | Distance from the origin to $G_{CT}$ on the axis y |
| $Y_{CE}$: | Distance from the origin to $G_{Ce}$ on the axis y |
| $Y_A$: | Distance between the bearings A and B |
| $X_D$: | Amplitude of the dynamic unbalance on the axis x |
| e: | Eccentricity of the wetted clothes load on the axis x |
| $R_A$: | Reaction of the bearing A |
| $R_B$: | Reaction of the bearing B |

Floating Group Balance

FIG. 3a shows the forces ratios, application points and distances in the floating group of a machine according to this invention. For calculating, it is started from balance equations of the centrifugal forces on the floating group (in which the expressions of the forces have been simplified dividing by the square of the angular speed $\omega^2$), established for a best understanding for a simplified case in which there exists no "pitching motion". Said equations however, may be generalized for the cases in which there exists a relatively small pitching motion, frequent in this kind of machines, without the final conclusions are substantially modified.

Equation of forces balance $$m_Q \cdot (e - X_D) - (m_T + m_E + m_{CT} + m_{CE}) X_D = 0 \quad (1)$$

Equation of moments balance $$m_Q \cdot (e - X_D) \cdot Y_Q - (m_T + m_E \cdot Y_E + Y_E + m_{CT} + m_{CE}) X_D = 0 \quad (2)$$

Starting from the second (2) of these equations of balance and supposing the mass of the counterweigh 40 associated to the front part of the wrapping bin 10 is known as well as the remaining masses and their respective distances with respect to the origin on the axis y and the mass of the counterweigh associated to the front part of the drum 20, it results:

Mass of the counterweigh associated to the drum $$m_{CT} = \frac{m_T \cdot (Y_T - Y_Q) + m_E \cdot (Y_E - Y_Q) + m_{CE} \cdot (Y_{CE} - Y_Q)}{Y_Q - Y_{CT}} \quad (3)$$

Staring from the equation (1) of the forces balance and with the value of the mass of the counterweigh 42 associated to the drum calculated, the amplitude $X_D$ can be found (shown in FIG. 5d) of the motion of dynamic unbalance of the floating group, that means, the amplitude of the shift of the rotation centre line M with respect to the actual rotation axis N, which results:

Amplitude of the floating group unbalance motion $$X_D = \frac{m_Q}{m_Q + m_T + m_E + m_{CT} + m_{CE}} \cdot e \quad (4)$$

Of the equation (3) of the calculation of the mass of the counterweigh 42 associated to the front part of the drum 20 it is deducted (bearing in mind the positive and negative signs) that of a reduction of the parameter $m_{CE}$ corresponding to the counterweigh 40 associated to the wrapping bin 10, an increase of the mass $m_{CT}$ necessary for the counterweigh 42 associated to the front part of the drum 20 is derived. If, as it will be demonstrated below, a transfer of mass from the counterweigh 40 of the wrapping bin 10 towards the counterweigh 42 of the front part of the drum 20 releases to a large extent structural stresses from the main parts and components of the floating group, so that these can be constructed and selected in order they are lighter, the parameters of the masses $m_E$ and $m_T$ of the bin and the drum will also be reduced, which in turn will promote a lower need of masses $m_{CR}$ and $m_{CE}$ at the counterweighs associated to the front part of the drum and the bin, which in turn will alleviate even more the stresses of the tin and drum structures, and so on.

By "light" or "light construction" it is meant a type of construction with mechanical strength requirements, either by shape, materials or components, significantly lower with respect to those which would be necessary without implementing the construction principle of this invention for same performances of high speed centrifugation.

From the expression (4) of the amplitude $X_D$ of the unbalance motion of the floating group, it is deducted that a masses transfer from the counterweigh 40 fixed on the wrapping bin 10 to the counterweigh 42 fixed on the drum 20 would not affect said amplitude $X_D$ provided that the sum of both masses $m_{CE} + m_{CT}$ remains constant. This lead to the limit means that it is possible to completely remove the counterweigh 40 associated to the bin 10 transferring its whole mass to the counterweigh 42 associated to the drum 20 without the amplitude of the unbalance motion increases for it, although in the practice said case is not necessary, nor even advisable. The main purpose is to reduce structural stresses on the floating group which allows a light construction thereof, and it was checked, as it will be seen below, that particularly beneficial effects in this sense are obtained from a ratio $[m_{CT}/(m_{CT} + m_{CE})] + 100 = 55$ or over.

It has to be pointed out that the maximum amplitude $X_D$ of the vibrating motion is given by the conditions of the design of the floating group suspension, and that therefore it results scarcely any benefit from the obsession to decrease this parameter, as the difference of costs meant by a suspension capable to absorb a higher displacement amplitude is not significant. However, for above explained reasons, said amplitude $X_D$ must be kept within a reasonable interval of values with relation to the free space around the floating group.

As it has been said many times, the end purpose of said masses transfer from the counterweigh 40 associated to the wrapping bin 10 towards the counterweigh 42 associated to the drum 20 is to make possible a reduction of the structural stresses which allows a lighter and therefore cheaper construction of the floating group. Said reduction of stresses can be exemplified by means of the reactions $R_A$ and $R_B$ of the bearings A and B, as these affect the bearings A, B themselves, at the bending moments on the driving shaft 16, at the stresses on the bearing box 30, and on the rear walls 14, 24 of the wrapping bin 10 and the drum 20, and so on.

To find said reactions $R_A$ and $R_B$ of the bearings A and B, it can be started regardless the equations of balance of centrifugal forces and moments which are generated as well on the wrapping bin 10 (equations (5), (6) as on the drum 20 (equations (9), (10)). The numeral results obtained in any of the two cases must be identical, therefore comparing them serves, in addition, for checking the calculation accurateness.

FIG. 3b illustrates the centripetal forces on the drum 20 and their respective distances at the origin O of the coordinates.

Balance of the forces of the drum: $\Sigma F_X = 0$ $$R_A - R_B + [m_Q \cdot (e - X_D) - (m_T + m_{CT}) \cdot X_D] \cdot \omega^2 = 0 \quad (5)$$

Balance of the moments of the drum: $\Sigma M_Z = 0$ $$-R_B \cdot Y_B - [m_Q \cdot Y_Q \cdot (e - X_D) - (m_T \cdot Y_T + m_{CT} \cdot Y_{CT}) \cdot X_D] \cdot \omega^2 = 0 \quad (6)$$

Reactions of the bearings from above equations (5), (6) of balance of forces and moments of the drum 20

$$R_A = \left\{ m_Q \cdot \left(1 - \frac{Y_Q}{Y_B}\right) \cdot (e - X_D) - \left[m_T \cdot \left(1 - \frac{Y_T}{Y_B}\right) + m_{CT} \cdot \left(1 - \frac{Y_{CT}}{Y_B}\right)\right] \cdot X_D \right\} \cdot \omega^2 \quad (7)$$

$$R_B = \left[m_Q \cdot \frac{Y_Q}{Y_B} \cdot (e - X_D) - \left(m_T \cdot \frac{Y_T}{Y_B} + m_{CT} \cdot \frac{Y_{CT}}{Y_B}\right) \cdot X_D \right] \cdot \omega^2 \quad (8)$$

In the FIG. 3c the centrifugal forces are illustrated on the wrapping bin 10 and their respective distances to the origin O of the coordinates.

Balance of forces of the wrapping bin: $\Sigma F_X = 0$ $$R_A - R_B + (m_E + m_{CE}) \cdot X_D \cdot \omega^2 = 0 \quad (9)$$

Balance of moments of the wrapping bin: $\Sigma M_Z = 0$ $$-R_B \cdot Y_B - (m_E \cdot Y_E + m_{CE} \cdot Y_{CE}) \cdot X_D \cdot \omega^2 = 0 \quad (10)$$

Reactions of the bearings from the equations (9), (10) of balance of forces and moments of the wrapping bin 10

$$R_A = \left[ m_E \cdot \left(1 - \frac{Y_E}{Y_B}\right) + m_{CE} \cdot \left(1 - \frac{Y_{CE}}{Y_B}\right) \right] \cdot X_D \cdot \omega^2 \quad (11)$$

$$R_B = -\left( m_E \cdot \frac{Y_E}{Y_B} + m_{CE} \cdot \frac{Y_{CE}}{Y_B} \right) \cdot X_D \cdot \omega^2 \quad (12)$$

From the equation (7), of the reaction $R_A$ of the bearing A to the forces exerted on the drum 20 it is deducted (bearing in mind the positive and negative parameters) that an increase of the mass $m_{CT}$ of the counterweigh 42 associated to the front part of the drum 20 entails a diminution in said reaction $R_A$, and same occurs with respect to the equation (8) of the reaction $R_B$ of the bearing B. However, from the equations (11), (12) of the reactions $R_A$ and $R_B$ of the respective bearings A and B to the forces which are applied on the wrapping bin 10 it is deducted (bearing in mind the positive and negative parameters) that a diminution of the mass $m_{CE}$ of the counterweigh 42 associated to the front part of the wrapping bin 10 implies a diminution in said reactions $R_A$ and $R_B$.

This can be checked trying with different values, for example, decreasing the value of the mass $m_{CE}$ of the counterweigh 40 associated to the front part of the wrapping bin 10 and increasing in an equivalent amount the mass $m_{CT}$ of the counterweigh 42 associated to the drum 20, keeping the amplitude $X_D$ of the vibrating motion of the floating group constant and, which is the most important, providing a reduction of the reactions $R_A$ an $R_B$ of the bearings A and B, and therefore, of the structural stresses of the whole floating group which allow a lighter construction thereof.

For this, above equations have been implemented in a simulation computer program of the behaviour of a washing-centrifugal machine of above kind, the results of which have been checked to be highly reliable when compared with actual tests. As an example, it was taken as reference for the simulation an industrial type washing-centrifugal machine for 8 Kg of clothes, capable to centrifuge up to a G factor 300, with a mass and dimensions of the drum and of the wrapping bin corresponding to a "light" type of construction. In said simulation, values have been input succeedingly for the masses of the counterweighs associated to the front part of the drum 20 and the wrapping bin 10 keeping the value of the sum of their masses constant, in this example, $m_{CE} + m_{Ct} = 40$ Kg=CTE, so that the mass $m_{CT}$ of the drum started at 0 Kg gradually increasing up to 40 Kg, while the mass $m_{CE}$ of the wrapping bin was started at 40 Kg to decrease, in concordance, down to 0 Kg. The results are shown in Table 1, and FIG. 4 shows a graphic plotted from said results, in which the shadowed interval of the ratio value $[m_{CT}/(m_{CE} + m_{CT})] \times 100$ (in %) between the masses of the counterweighs 40, 42 respectively associated to the front parts of the wrapping bin 10 and the drum 20 claimed by this invention.

TABLE 1

| Counterweigh mass on the drum (Kg) | Counterweigh mass on the wrapping bin (Kg) | Ratio of counterweigh masses [Drum/(Drum + Bin)] (%) | Maximum bending moment at the driving shaft (Nm) |
|---|---|---|---|
| 0 | 40 | 0 | 181.7 |
| 22 | 18 | 55 | 95.7 |
| 26.5 | 13.5 | 66.25 | 77.7 |
| 30 | 10 | 75 | 63.3 |
| 32 | 8 | 80 | 55.3 |
| 34 | 6 | 85 | 47.3 |
| 36 | 4 | 90 | 39.2 |
| 38 | 2 | 95 | 31.5 |
| 40 | 0 | 100 | 22.7 |

Figure 4:
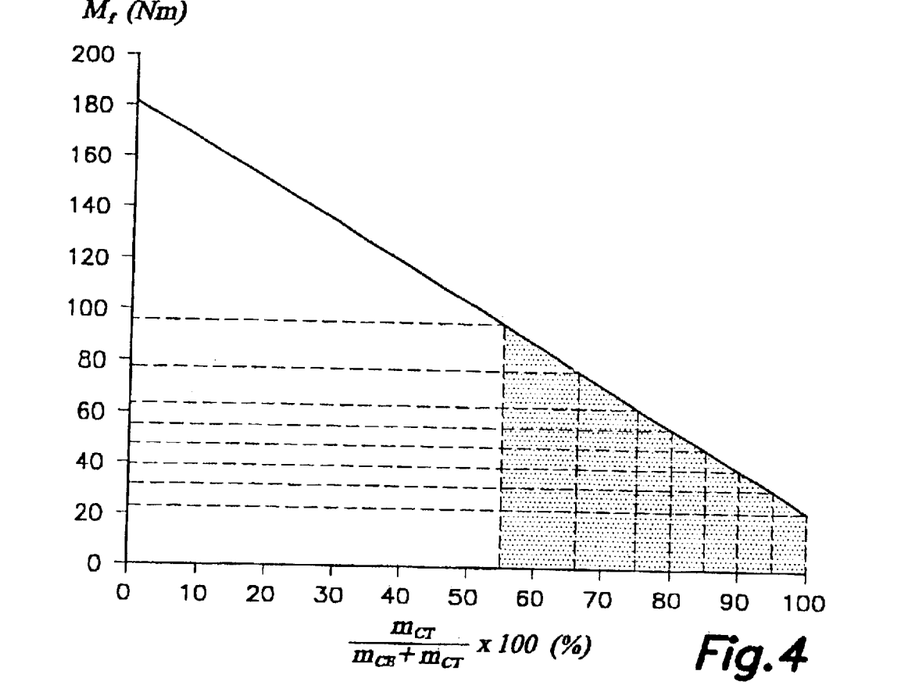
FIG. 4 is a graphic of the results of an example of simulated test which illustrates the evolution of the bending moments on the drum driving shaft in front of different rates of distribution of counterweigh masses.

Above results, as well as the graphic of FIG. 4, show that a transfer of the mass $m_{CE}$ of the counterweigh 40 associated to the front part of the wrapping bin 10 to the mass $m_{CT}$ of the counterweigh 42 associated to the front part of the drum 20 results highly beneficial as for a decrease of the structural stresses on the floating group, said decrease of stresses is shown in the example of a decrease at the maximum bending moment (which occurs at the position of the bearing A) of the driving shaft 16. The current inventors consider specially beneficial that the ratio between the mass $m_{CT}$ of the counterweigh of the front part of the drum with respect to the total mass of the counterweighs associated to the front part of the floating group (drum and wrapping bin) is at least 55% or more (the shadowed area in the graphic of FIG. 4).

However, as it was explained above, the introduction of a counterweigh on the drum entails drawbacks, over all economic drawbacks, associated to the need to use anti-rust materials because said counterweigh will sustain the baths of the washing and rinsing processes, including detergents and lyes at relatively high temperatures. If said mass $m_{CT}$ is contributed with as an "actual" solid mass $m_{PE}$, centred on the centre line M of the drum 20, its cost can be very high.

To prevent said drawbacks, fluid equilibrating rings 60 can be installed, as those disclosed in said patent U.S. Pat. No. 2,525,781, of Jey Grant De Remer, which as it will be explained below allow to advantageously obtain effects equivalent to those of the "actual" mass $m_{PE}$ by means of a much lower "equivalent" mass $m_A$ which corresponds to the effective mass of the fluid contained in the chambers the fluid rings 60 of which can be constructed with low cost, in a classical way, by plastic injection moulding.

Therefore, for the purpose of the definition of this invention, it is essential to have available a mathematic function which allows to accurately set a ratio between "equivalent mass" and "actual mass", that means, a ratio between said effective mass $m_A$ of liquid contained in fluid rings which produces dynamic effects equivalents to those of a generally solid given mass $m_{PE}$, centred with the drum centre line 20 and the mass $m_{PE}$ itself, as both sustain a same centripetal acceleration.

FIG. 5a–5d are diagrams which illustrate the deduction of the value of the equivalent mass produced by a fluid equilibrating ring containing a given mac of fluid, comparable to a mass of a solid counterweigh located in same position. In FIG. 5a–5d and/or the following equations, following designations are used:

| | |
|---|---|
| PE: | Cylindric external wall of a fluid equilibrating ring |
| H: | Circular horizon produced in the fluid within the ring when it rotates |
| $R_{PE}$: | Radius of the equilibrating ring external wall |
| $R_H$: | Radius of the fluid circular horizon |
| b: | Equilibrating ring axial width (not shown in FIGS. 5a–5d) |
| $m_A$: | Effective mass of the fluid which partly fills the equilibrating ring |
| $m_{PE}$: | Mass of the fluid hypothetically comprised within a cylinder limited by the external wall of the equilibrating ring and of depth b |
| $m_H$: | Mass of the fluid hypothetically comprised within a cylinder limited by the circular horizon and of depth b |
| M: | Drum centre line = centre of masses of $m_{PE}$ |
| N: | Drum actual rotation axis = centre of masses of $m_H$ |
| $G_A$: | Centre of masses of the mass $m_A$ |
| $X_D$: | Amplitude of the floating group dynamic unbalance motion = distance from M up to N |
| $X_A$: | Distance from $G_A$ up to N |
| $X_H$: | Distance from the centre of masses of $m_H$ up to N |
| Y: | Density of the fluid |

Figure 5A:
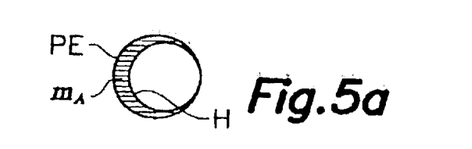
FIGS. 5a–5d are diagrams which illustrate the deduction of the equivalence between the actual mass and equivalent mass values obtained in a fluid equilibrating ring.
Figure 5B:
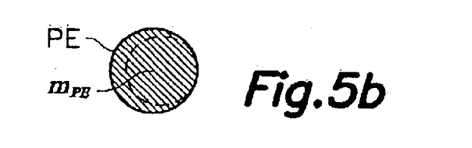
Figure 5C:
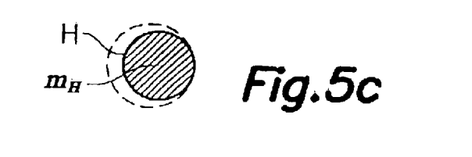

It is started from the definition of the mass $m_A$ of the fluid contained within the equilibrating ring, which when it rotates jointly with the drum during a centrifugation is arranged between the external wall PE of the ring and the circular horizon H (shadowed area of the FIG. 5a), as the Boolean substraction of the mass $m_H$ of the fluid hypothetically comprised within the disk limited by the circular horizon H (shadowed area of the FIG. 5c) of the mass $m_{PE}$ of the fluid hypothetically comprised within a disk limited by the external wall PE (shadowed area of the FIG. 5b) of the equilibrating ring, all of them with a same width b.

$$m_A = m_{PE} - m_H \tag{13}$$

Figure 5D:
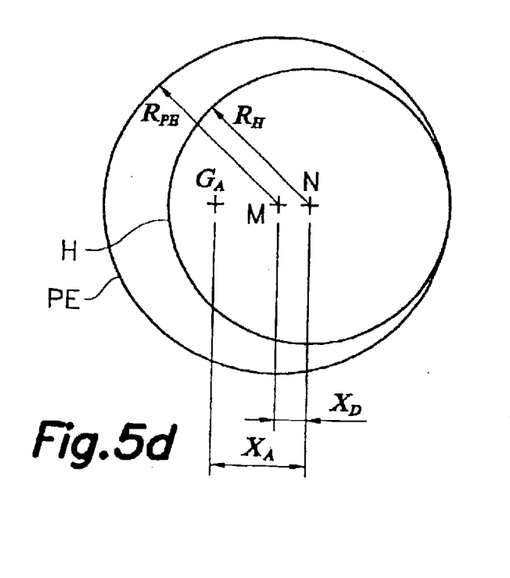

The distance $X_A$ (see FIG. 5d) from the centre of the masses $G_A$ of the mass $m_A$ up to the actual rotation axis N is:

$$X_A = \frac{m_{PE} \cdot X_D - m_H \cdot X_H}{m_{PE} - m_H} \tag{14}$$

but bearing in mind that $X_H = 0$, as the circular horizon H was just created by the effect of the centripetal acceleration generated by the rotation of the drum about the actual rotation axis N and it is therefore coaxial with it, the preceding exposition is then:

$$X_A = \frac{m_{PE} \cdot X_D}{m_{PE} - m_H} \tag{15}$$

arranging and equalizing with the first equation, the equivalence of the effect of the counterweigh between an actual mass and an equivalent mass is obtained by a fluid ring.

Effect equivalent to the "equivalent mass"

$$m_A X_A = m_{PE} X_D \tag{16}$$

This equation demonstrates that the effect produced by the mass $m_A$ of the fluid contained in the equilibrating ring by the distance $X_A$ from its centre of masses $G_A$ to the actual rotation axis N is equivalent to the effect which would be produced by the mass $m_{PE}$ of the fluid hypothetically contained within the cylinder limited by the external wall PE of the ring by the distance $X_D$ from its centre of masses (which coincides with the centre line M of the drum) to the actual rotation axis N, both with a same axial depth b. Therefore, the equivalent mass would be:

"Equivalent mass"

$$m_A = m_{PE} = \Pi \cdot R^2_{PE} \cdot b \cdot \gamma \tag{17}$$

This equivalent mass $m_{PE}$ is generally 12 to 20 times higher than the mass of fluid $m_A$ effectively used, which demonstrates the advantages of equilibrating by means of fluid rings for achieving the contribution of a main counterweigh mass associated to the drum 20 which generates significant effects which allows to substitute a large part of the counterweigh mass associated to the wrapping bin 10, according to the basic principle of this invention.

It is also obvious that higher is the density γ of the fluid greater will be the counterweigh effect. However, most of the fluids having a density significantly higher than the water are highly contaminant or corrosive, and of course, they have a higher cost than the water. Therefore, it is advisable to the extent it is possible, to use water as equilibrating fluid.

Figure 6:
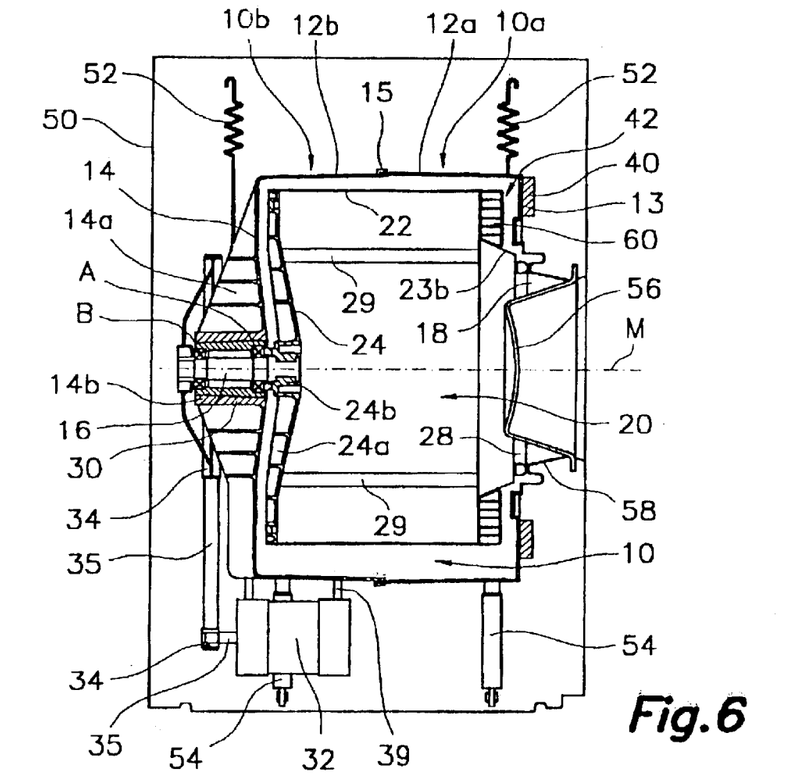
FIG. 6 is a simplified sectional view of a side elevation of a clothes washing-centrifugal machine according to this invention.

Referring now to FIG. 6, it is shown in a very simplified way a non limitative example of embodiment of a centrifugal machine according to this invention, such as a washing-centrifugal machine for clothes, of which the elements which are not related to the construction principle of this invention have been suppresses, said machine incorporating said floating group "light" construction.

The machine of the FIG. 6 comprises a frame or bench 50 from which a floating group is suspended, essentially formed of a wrapping bin 10 to contain and/or collect a bath, a drum 20 for a load of material to be centrifuged Q (not shown in FIG. 6) mounted so that it can rotate within the wrapping bin 10 and a motor 32 fixed on the bin 10 and connected to said drum 20 to rotate it. The suspension comprises a system of springs 52 and of vibration eliminators 54 arranged between the bench 50 and the floating group. The wrapping bin 10 and the drum 20 have available at one of their ends, of respective loading/unloading mouths 18, 28, of axial access, substantially coincident with each other and with a loading/unloading mouth of the frame provided with a door 56, preferably of a transparent material. In order to insulate the internal part of the wrapping bin from its external part, between the loading/unloading mouth 18 of the wrapping bin 10 and the frame of the door 56 of the frame 50, an elastic sleeve 58 has been provided which is capable to absorb the relative vibrating motions between the frame 50 and the wrapping bin 10.

The wrapping bin 10 can be obtained, for example, from plastic injection moulding, essentially in two parts, a front part 10a and a rear part 10b. The front part 10a comprises a first external wrapping semi-wall 12a and a front wall 13 having an external peripheral edge stiffly joined to an end of said first wrapping semi-wall 12a and an internal peripheral edge which delimits said loading/unloading mouth 18. On said front wall 13 of the wrapping bin 10 a counterweigh 40 is fixed which is made of solid and dense material, such as a relatively heavy metal or concrete which can adopt an annular, quadrangular shape with a large central opening, or any other convenient shape. The rear part lob comprises a second wrapping semi-wall 12b and a rear wall 14 with an external peripheral edge stiffly joined to an end of said second external wrapping semi-wall 12b, said rear wall 14 including a plurality of reinforcing ribs 14a, matched in as well axial as radial directions, which are ending at a central area in a cube 14b for a bearing box 30, formed by a simple steel socket, for bearings A and B. The two front and rear parts 10a and 10b of the wrapping bin 10 are joined by the free ends of the respective first and second external semi-walls 12a and 12b by means of an embedment of shape 15 consolidated by fastening means, either mechanical such as a clamping flange or through adhesion or welding.

On its side, the drum 20 comprises an external wrapping wall 22, of revolution with respect to a centre line M, typically cylindric and provided with borings, a front wall 23, with an external peripheral edge stiffly joined to an end of said external wrapping wall 22 and an internal peripheral edge which delimits said loading/unloading mouth 28 of the drum 20, and a rear wall 24 with an external peripheral edge stiffly joined to an end of said external wrapping wall 22, the rear wall 24 of which includes a plurality of reinforcing ribs 24a, matched in as well axial as radial directions, which are ending at a central area in a cube 24b for a driving shaft 16, aligned with said centre line M, stiffly joined to said cube 24b. The driving shaft 16 is inserted in said bearings A and B so that an end thereof protrudes at the external end of the bearing box 30, on the protruding end of the driving shaft 16 of which is joined integral a driven pulley 34 connected by means of a belt 35 to a driving pulley 36 integral with the output axis 38 of the motor 32, which is stiffly joined to the wrapping bin 10 by means of supports 39. Said front wall 23 of the drum has a frustum-shaped section 23b which provides a space in which a counterweigh 42 is located and fixed, which is formed by a plurality of concentric fluid equilibrating rings 60 which will be described in detail below with relation to FIG. 7, jointly with other construction details of the drum. Within the drum 20, blades 29 are arranged for stirring the clothes load at the washing and rinsing steps, said blades 29 are substantially parallel to the centre line M and are extending a certain length in radial direction towards the centre of the drum, and typically adopt a hollow triangular cross section.

It is a characteristic of the washing-centrifugal machine of this invention that the mass ratio, either actual or equivalent obtained by fluid equilibrating rings, of the counterweigh 42 associated to the front part of the drum 20 is at least 55% the total sum of the counterweigh masses 40 and 42 respectively associated to the front parts of the wrapping bin 10 and drum 20, that means, that most of the part of the total mass of said counterweighs 40 and 42, resulting from adding their respective masses $m_{CE}$ and $m_{CT}$, is concentrated in the counterweigh 42 associated to the front part of the drum 20.

Figure 7:
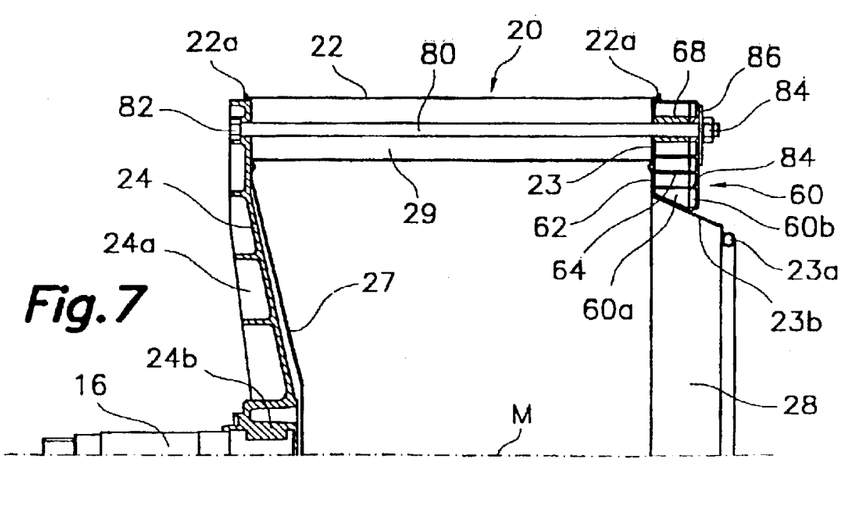
FIG. 7 is a sectional view in elevation illustrating a detail of an example of alternative embodiment of the drum.

FIG. 7 is an enlarged detail showing a preferred example of embodiment of the drum 20, of which only the higher half has been shown as it is substantially symmetrical to the lower half. The drum enclosure 20 comprises the wrapping external wall 22, the front wall 23 and an internal rear wall 27 constructed in a thin sheet metal, typically of stainless steel and joined at its respective edges by flanging them 22a. An external support 24 of the drum 20, obtained by injection moulding of a slight metal alloy such as aluminium, is externally supported on the internal rear wall 27, said support 24 includes a plurality of reinforcing ribs 24a, matched in as well axial as radial directions, which are ending at a central area in a cube 24b for a driving shaft 16, of steel, aligned with said centre line M and stiffly joined to said cube 24b by shape embedment obtained by arranging said driving shaft 16 as a metallic insert in the aluminium moulded part. On its side, the front face 23 includes a frustum-shaped section 23b which provides a space for said concentric fluid equilibrating rings 60, the frustum-shaped section 23b of which is ending in an internal peripheral edge having a closed groove 23a which delimits the loading/unloading mouth 28. The fluid equilibrating rings 60 are obtained in a classic way by plastic injection moulding into two parts; a first part 60a, comprising a circular-crown-shaped sidewall 62 from which are projecting a plurality of cylindric annular walls 64, and a second cover-like part 60b, provided with a plurality of plugs (not shown) each corresponding to one of the rings 60, for filling/emptying them, and which eventually can include walls 66 or annular slots to couple or fit with the annular cylindric walls 64 of the first part 60a. Both parts are joined integral by means of adhesive or welding forming a plurality of sealed concentric chambers adapted to be partly filled with an equilibrating fluid. To take a best profit of the space available, the ring situated in the more internal position is adapted to said frustum-shaped section 23b of the front wall 23. On any of the first or second parts 60a and 60b, preferably on the first, small deflectors are arranged (not shown) within each of the sealed chambers, the purpose of which is to assist to the fluid withdrawal together with the annular cylindric walls 64, namely during the beginning of the acceleration to reach a centrifugal speed. Said deflectors must not prevent, however, the water free distribution to form said circular horizon.

In above described example of embodiment, the whole drum 20 is packaged and stiffened by tie bars 80 parallel to the centre line M which cross said external and internal rear walls 24, 27, the front wall 23 and the first and second parts 60a, 60b of the fluid equilibrating rings 60, crossing the drum 20 through the interior of each of said blades 29 having a triangular cross section profile, which operate under compression as stiffening elements. Each tie bar 80 has a head 82 retained in an offset of the rear external wall 24 and a threaded end which protrudes from the fluid equilibrating rings 60 to receive an hold-down and locking nut 84. A circular-crown-shaped reinforcing part 86 is interposed between said nuts 82 and the fluid equilibrating rings 60 to best distribute the pressure exerted by the tie bars on a larger external surface of said fluid equilibrating rings 60. To allow the passage of the tie bars 80, the fluid equilibrating rings 60 include passing holes, not shown, so that one of its concentric sealed chamber is not used, which allows to provide thicker annular walls (68) adjacent to said passing holes to stand the pressure exerted by the tied bars.

A man of the art will be capable to introduce a number of changes and variations without they are beyond the scope of this invention, which is defined in appended claims.

What is claimed is:

1. Centrifugal machine with a suspended floating group and an overhanging drum, such as a washing-centrifugal machines designed to high centrifugal speeds with high G factors, in which said suspended floating group comprises:

a wrapping bin (10) to contain and/or to collect a bath;

a drum (20) having bored walls for a load of material to be centrifuged (Q) mounted so that it can rotate within said wrapping bin (10);

a motor (32) fixed on the bin (10) and connected to said drum (20) to rotate it, said drum (20) being provided at one of its ends with a driving shaft (16) aligned with a centre line (M) supported and guided by bearings (A, B) housed within a bearing box (30) fixed on the wrapping bin (10) and in which when it rotates it creates by an effect of unbalanced masses produced by said load of material to be centrifuged (Q), an actual rotation axis (N) different from said centre line (M), separate from each other by a distance corresponding to an amplitude ($X_D$) of dynamic shift;

an equilibrating counterweigh (40) of a predetermined mass ($m_{CE}$) associated to a part of said wrapping bin (10) distal from the bearings (A, B), and an equilibrating counterweigh (42) having a predetermined mass ($m_{CT}$) associated to a part of said drum (20) distal from the bearings (A, B), characterized in that:

more than a half of the total mass of said counterweighs (40 and 42), resulting from adding to their respective masses ($m_{CE}$ and $m_{CT}$), is concentrated on the counterweigh (42) associated to the drum (20), said mass ($m_{CT}$) of the counterweigh (42) being either of a given magnitude ($m_{PE}$) and centred with said centre line (M) of the drum (20) or of a lower magnitude ($m_A$) and in the form of one or more fluid rings (60) which, when said drum rotates at a speed such that said drum produces a G factor over 1 and over the floating group resonance frequency, said drum remains misaligned at a higher distance than said amplitude ($X_D$) of dynamic shift producing dynamic effects equivalent to those of said given magnitude ($m_{PE}$), so that the structural stresses the floating group sustains are substantially reduced, and because:

several parts of said floating group, such as the wrapping bin (10), the drum (20), said bearing box (30), the bearings (A, B) and said driving shaft (16), are constructed with mechanical strength requirements as for the shape, materials or components, lower with respect to those which would be necessary if said more than a half of the total mass of said counterweighs (40 and 42) would be concentrated in the counterweigh (40) associated to the wrapping bin (10).

2. Machine according to claim 1, characterized in that the mass ratio ($m_{CT}$) associated to the drum (20) with respect to said total mass of said counterweighs (40 and 42), resulting from adding their respective masses ($m_{CE}$ and $m_{CT}$) is at least 55%, that means, it meets the ratio $[m_{CT}/(m_{CE}+m_{CT})]+100 \geq 55$.

3. Machine according to claim 1, characterized in that said fluid rings (60) comprise a plurality of concentric chambers which may contain a liquid which partly fills them, said chambers being arranged in a peripheral area of a front wall (23) of the drum (20), each of said chambers being of an internal radial height substantially equal to twice a distance corresponding to the maximum amplitude ($X_D$) of the dynamic shift of the floating group, that means, the distance between said centre line (M) and said actual rotation axis (N) at the maximum centrifugation speed.

4. Machine according to claim 3, characterized in that each of said concentric chamber is sealed and is partly filled with an amount of fluid sufficient to form, at the maximum centrifugation speed, a circular horizon (H) tangent to a point of an external cylindric wall (PE) of the chamber and separate from it by a distance twice said amplitude ($X_D$) at a point diametrically opposite to the point of said tangency.

5. Machine according to claim 3, characterized in that said fluid rings (60) comprise at least three of said concentric chambers.

6. Machine, according to claim 5, characterized in that said fluid rings (60) comprise four of said concentric chambers.

7. Machine according to claim 5, characterized in that said fluid rings (60) comprise five of said concentric chambers.

8. Machine according to claim 3, characterized in that said front wall (23) comprises an external peripheral edge stiffly joined to an end of a wrapping wall (22) of the drum (20) and a loading/unloading mouth (28) of axial access thereof, and a stepped area which provides a space for said fluid rings (60) between said external edge and said loading/unloading mouth (28).

9. Machine according to claim 8, characterized in that said fluid rings (60) have an axial width which does not protrude from the plane of said loading/unloading mouth (28), and in that said stepped area comprises a frustum-shaped section (23b) the more internal of said plurality of concentric chambers of the fluid rings (60) being adapted to the shape of said frustum-shaped section (23b).

10. Machine, according to claim 8, characterized in that the fluid rings (60) comprise a first and a second parts (60a and 60b) obtained by plastic injection moulding, said first part (60a) comprises a circular-crown-shaped sidewall (62), from which are protruding a plurality of annular cylindric walls (64) and small deflectors arranged between them to assist to draw the fluid without preventing a free distribution thereof, while said second part (60b) can be cover-like tightly fixed on said first part (60a) to form said plurality of sealed concentric chambers, including a plurality of plugs, each corresponding to one of said chambers, for filling/emptying them.

11. Machine, according to claim 8, characterized in that the drum (20) comprises, in addition to said wrapping wall (22) and the front wall (23) a rear internal wall (27), said three walls (22, 23, 27) being constructed with a thin stainless steel sheet and joined by its respective edges by welted folds 22a, and a rear external support (24), obtained by moulding a light material, such as aluminium, externally attached on said rear internal wall (27), said rear external support (24) including a plurality of reinforcing ribs (24a) combined in both axial and radial directions which are ended in a central area in a hub (24b) supporting said driving shaft (16), aligned with said centre line (M), which is of a stronger material and is stiffly joined to said hub (24b) by embedment of shape, as an insertion in the part of the moulded rear external wall (24).

12. Machine, according to claim 11, characterized in that the drum (20) comprises in addition tie bars (80) parallel to its centre line (M) which cross it from one end to the other in the interior of blades (29), having a triangular cross section and fixed to the wrapping wall (22), forming a package with said rear internal and external walls (24, 27), the wrapping wall (22), the front wall (23) and the first and second parts (60a, 60b) of the fluid equilibrating rings (60), where said blades (29) operate under compression as drum (20) stiffening elements.

13. Machine, according to claim 12, characterized in that each of the tie bars (80) has as head (82) retained in a related offset of the rear external support (24) and a threaded end which protrudes from the fluid rings (60) to receive a hold-down and fastening nut (84), reinforcing washers (86) and interposed between said nuts (82) and the fluid rings (60) for distributing the pressure exerted by the tie bars (80) on a larger external surface of said fluid equilibrating rings (60).

14. Machine, according to claim 13, characterized in that the fluid rings (60) in addition include, between two of its concentric sealed chambers, thicker annular walls (68) which have formed holes for allowing the passage of the tie bars (80) through said thicker annular walls, said annular walls (68) being adapted to stand the pressure exerted by the tie bars (80).

15. Machine, according to claim 3, characterized in that the wrapping bin (10) comprises a front part (10a) and a rear part (10b) obtained by plastic injection moulding, said front part (10a) comprising a first external wrapping semi-wall (12a) and a front wall (13) which includes a loading/unloading mouth (18), while the rear part (10b) comprises a second wrapping semi-wall (12b) and a rear wall (14) which includes a plurality of reinforcing ribs (14a) combined in both axial and radial directions, which are ended at a central area in a hub (14b) for said bearing box (30), formed by a metallic socket, both front and rear parts (10a, 10b) being joined at their free ends of their respective wrapping semi-walls (12a and 12b) by an embedment of shape (15) consolidated by either mechanical, adhesive or welded fastening means.

\* \* \* \* \*